(12) United States Patent
Fukumori

(10) Patent No.: US 11,061,691 B2
(45) Date of Patent: Jul. 13, 2021

(54) SUPPRESSION OF MEMORY AREA FRAGMENTATION CAUSED BY BOOTING AN OPERATING SYSTEM

(71) Applicant: FUJITSU LIMITED, Kawasaki (JP)

(72) Inventor: Masato Fukumori, Chohu (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 16/407,246

(22) Filed: May 9, 2019

(65) Prior Publication Data
US 2019/0361709 A1    Nov. 28, 2019

(30) Foreign Application Priority Data

May 25, 2018   (JP) .............................. JP2018-100420

(51) Int. Cl.
*G06F 9/4401*    (2018.01)
*G06F 3/06*      (2006.01)
*G06F 9/50*      (2006.01)

(52) U.S. Cl.
CPC .......... *G06F 9/4406* (2013.01); *G06F 3/0604* (2013.01); *G06F 3/0631* (2013.01); *G06F 3/0673* (2013.01); *G06F 9/505* (2013.01); *G06F 9/5016* (2013.01); *G06F 9/4401* (2013.01)

(58) Field of Classification Search
CPC .... G06F 9/4406; G06F 3/0604; G06F 9/5016; G06F 3/0673; G06F 9/505; G06F 3/0631; G06F 9/4401
USPC .......................................................... 713/2
See application file for complete search history.

(56) References Cited

U.S. PATENT DOCUMENTS

| 6,385,721 | B1 * | 5/2002 | Puckette ............... G06F 9/4408 713/2 |
| 6,643,754 | B1 * | 11/2003 | Challenger ........... G06F 12/023 707/999.202 |
| 7,577,814 | B1 * | 8/2009 | Yakovlev ............ G06F 9/44557 711/170 |
| 8,909,980 | B1 * | 12/2014 | Lewis ................. G06F 11/1658 714/5.11 |
| 2005/0066145 | A1 * | 3/2005 | Han .................... G06F 11/1417 711/173 |
| 2008/0162867 | A1 * | 7/2008 | Shin ..................... G06F 9/4401 711/173 |
| 2009/0259836 | A1 * | 10/2009 | Chan ..................... G06F 9/4406 713/2 |

(Continued)

FOREIGN PATENT DOCUMENTS

JP    2003-242026    8/2003
JP    2008-158964    7/2008

*Primary Examiner* — Volvick Derose
(74) *Attorney, Agent, or Firm* — Fujitsu Patent Center

(57) ABSTRACT

An apparatus includes a memory and a processor that executes a load process. In the load process, the processor sets, in a storage area of the memory, a first storage area and a second storage area that are smaller than the storage area, creates first notification information that informs that the second storage area is unavailable and the first storage area is available, and allocates an area in the first storage area, based on the first notification information. The processor boots an operating system, and responds to a memory information notification request issued by the booted operating system with second notification information that informs that the second storage area is available.

6 Claims, 13 Drawing Sheets

(56) References Cited

U.S. PATENT DOCUMENTS

| | | | | |
|---|---|---|---|---|
| 2011/0283065 A1* | 11/2011 | Kurashige | ........... | G06F 12/0804 |
| | | | | 711/118 |
| 2012/0303927 A1* | 11/2012 | Goldberg | ................ | G06F 12/02 |
| | | | | 711/171 |
| 2013/0346369 A1* | 12/2013 | Kondou | .............. | G06F 11/0712 |
| | | | | 707/642 |
| 2013/0346738 A1* | 12/2013 | Kimura | ................ | G06F 21/575 |
| | | | | 713/2 |
| 2014/0298000 A1* | 10/2014 | Gillespie | ............... | G06F 3/0604 |
| | | | | 713/2 |
| 2015/0033002 A1* | 1/2015 | Cordero | ............. | G06F 9/45558 |
| | | | | 713/1 |
| 2016/0041782 A1* | 2/2016 | Deetz | ................ | G06F 11/1456 |
| | | | | 711/161 |
| 2017/0003977 A1* | 1/2017 | Sumida | .............. | G06F 9/45558 |

\* cited by examiner

| ITEM | CONFIGURATION PARAMETER NAME | CONFIGURATION VALUE |
|---|---|---|
| 1 | MEMORY AREA SIZE | 4 [GB] |
| 2 | MEMORY AREA BASE ADDRESS | 0x0000_0000 |
| 3 | OPERATION-PROCESS MEMORY AREA SIZE | 3 [GB] |

FIG. 5

| Field | value |
|---|---|
| Header | HobType=EFI_HOB_TYPE_RESOURCE_DESCRIPTOR |
| Owner | NOT SET |
| ResourceType | EFI_RESOURCE_SYSTEM_MEMORY |
| ResourceAttribute | OR-VALUE OF FOLLOWING FLAGS TO OPERATION-PROCESS MEMORY AREA<br>    EFI_RESOURCE_ATTRIBUTE_PRESENT<br>    EFI_RESOURCE_ATTRIBUTE_INITIALIZED<br>    EFI_RESOURCE_ATTRIBUTE_SINGLE_BIT_ECC<br>    EFI_RESOURCE_ATTRIBUTE_WRITE_BACK_CACHEABLE<br><br>OR-VALUE OF FOLLOWING FLAGS TO OS-PROCESS MEMORY AREA<br>    EFI_RESOURCE_ATTRIBUTE_PRESENT<br>    EFI_RESOURCE_ATTRIBUTE_INITIALIZED<br>    EFI_RESOURCE_ATTRIBUTE_TESTED<br>    EFI_RESOURCE_ATTRIBUTE_SINGLE_BIT_ECC<br>    EFI_RESOURCE_ATTRIBUTE_WRITE_BACK_CACHEABLE<br><br>PRESENT AND INITIALIZED AND NOT TESTED ARE SET TO OS-PROCESS MEMORY AREA, AND PRESENT AND INITIALIZED AND TESTED ARE SET TO OPERATION-PROCESS MEMORY AREA, AND THEN, IT IS READ AS, IN DXE PHASE, OS-PROCESS MEMORY AREA = AREA NOT TESTED = AREA NOT YET DETERMINED TO BE AVAILABLE = AREA NOT TO BE USED. |
| PhysicalStart | BASE ADDRESS OF MEMORY AREA |
| ResourceLength | SIZE OF MEMORY AREA |

FIG. 6

| Field | value |
|---|---|
| BaseAddress | BASE ADDRESS OF MEMORY AREA INDICATED BY THE ENTRY |
| EndAddress | END ADDRESS OF MEMORY AREA INDICATED BY THE ENTRY |
| Attributes | VALUE SET TO ResourceAttribute OF CORRESPONDING MEMORY AREA NOTIFICATION HOB. |
| GcdMemoryType | TYPE OF MEMORY AREA SET BASED ON INFORMATION ABOUT ResourceAttribute OF CORRESPONDING MEMORY AREA NOTIFICATION HOB. CONFIGURATION VALUE IS DETERMINED AS FOLLOWS:<br><br>( i ) WHEN EFI_RESOURCE_ATTRIBUTE_TESTED IS SET TO ResourceAttribute, EfiGcdMemoryTypeSystemMemory<br>( ii ) WHEN EFI_RESOURCE_ATTRIBUTE_TESTED IS NOT SET AND EFI_RESOURCE_ATTRIBUTE_INITIALIZED OR EFI_RESOURCE_ATTRIBUTE_PRESENT IS SET TO ResourceAttribute, EfiGcdMemoryTypeReserved<br>( iii ) IN OTHER CASES, EfiGcdMemoryTypeNonExistent<br><br>IN OS-PROCESS MEMORY, EfiGcdMemoryTypeSystemMemory IS SET TO OS-PROCESS MEMORY AREA, AND EfiGcdMemoryTypeReserved IS SET TO OPERATION-PROCESS MEMORY AREA. |
| | |

FIG. 7

| Field | value |
|---|---|
| Type | MEMORY AREA TYPE INDICATED BY THE ENTRY. EFI_MEMORY_TYPE DEFINED BY UEFI SPECIFICATION. SET EfiConventionalMemory IN CREATING (ADDING) NEW ENTRY. |
| Start | BASE ADDRESS (PA) OF MEMORY AREA INDICATED BY THE ENTRY |
| End | BASE ADDRESS (VA) OF MEMORY AREA INDICATED BY THE ENTRY |
| Attribute | TESTED |

FIG. 8

| Field | value |
|---|---|
| Type | MEMORY AREA TYPE INDICATED BY THE ENTRY. EFI_MEMORY_TYPE DEFINED BY UEFI SPECIFICATION. EfiConventionalMemory IS SET TO OPERATION-PROCESS MEMORY AREA. VALUE CORRESPONDING TO MEMORY ALLOCATION METHOD IS SET TO OS-PROCESS MEMORY AREA. |
| PhysicalStart | BASE ADDRESS (PA) OF MEMORY AREA INDICATED BY THE ENTRY |
| VirtualStart | BASE ADDRESS (VA) OF MEMORY AREA INDICATED BY THE ENTRY |
| NumberOfPages | THE NUMBER OF PAGES IN AREA. ONE PAGE IS 4 KB PHYSICALLY CONTIGUOUS MEMORY AREA. |

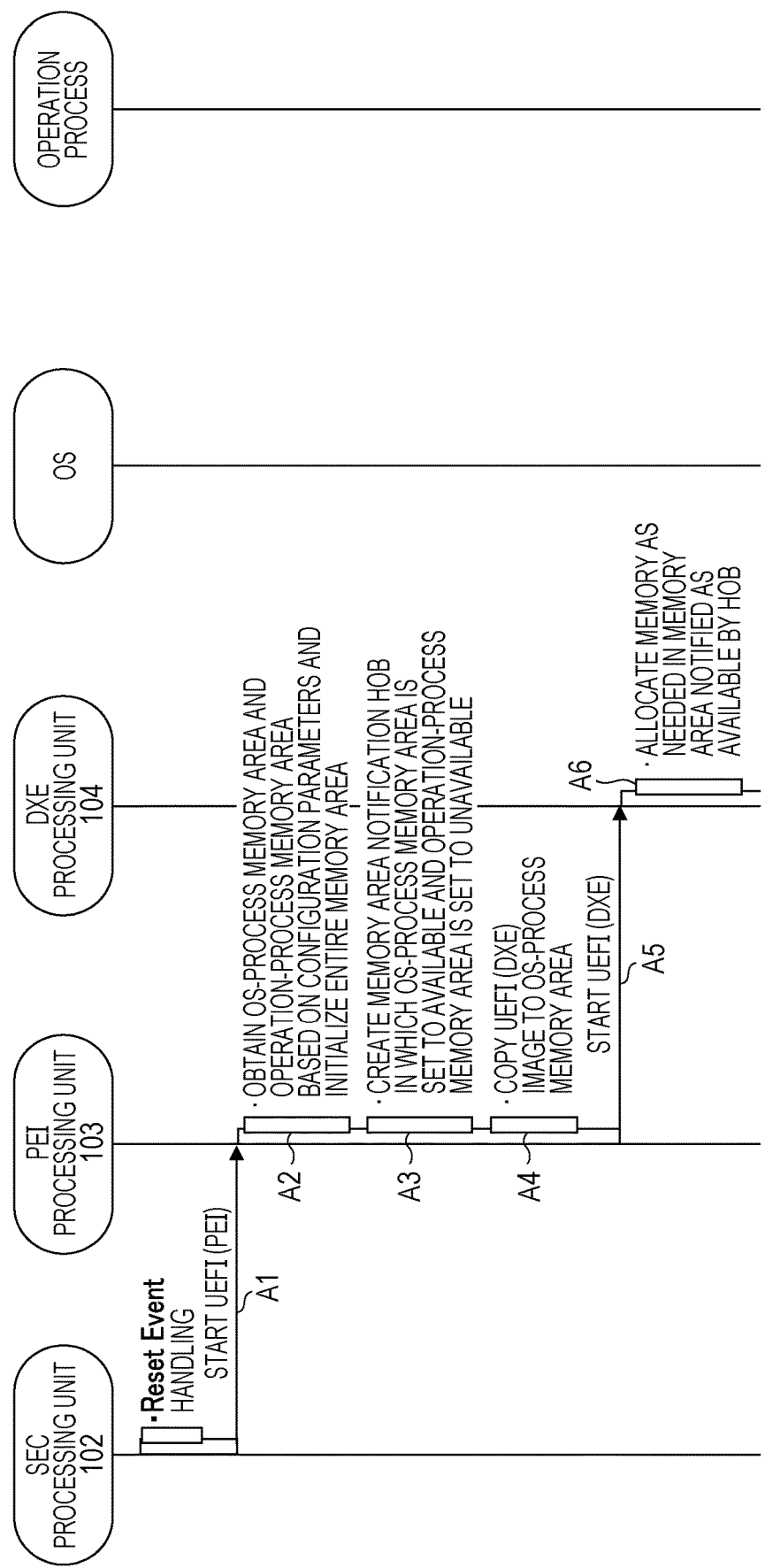

FROM FIG. 10A

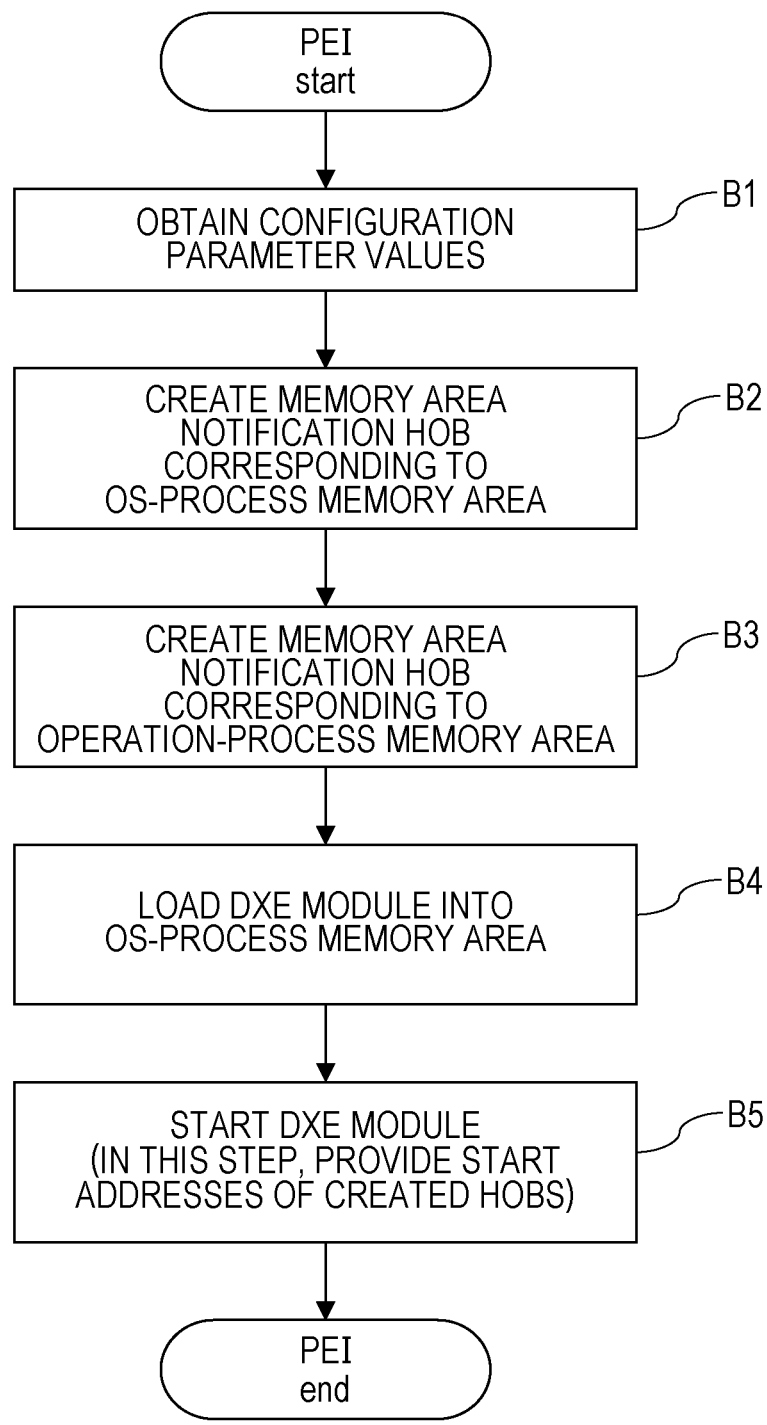

SUPPRESSION OF MEMORY AREA FRAGMENTATION CAUSED BY BOOTING AN OPERATING SYSTEM

CROSS-REFERENCE TO RELATED APPLICATION

This application is based upon and claims the benefit of priority of the prior Japanese Patent Application No. 2018-100420, filed on May 25, 2018, the entire contents of which are incorporated herein by reference.

FIELD

The embodiment discussed herein is related to suppression of memory area fragmentation caused by booting an operating system.

BACKGROUND

For example, in known techniques, as measures for operating system (OS) jitter in high performance computing (HPC), in a plurality of central processing unit (CPU) cores, a specific CPU core may be assigned to OS processing and the other CPU cores may be assigned to operation processing. In other known techniques, in order to allocate a largest memory to operation processing and reduce memory fragmentation, a memory area may be divided into a memory area for OS processing and a memory area for operation processing for use. Such a memory area division of the OS-process memory area and the operation-process memory area is implemented by the function of the OS.

The Unified Extensible Firmware Interface (UEFI) refers to an interface specification of an OS and firmware on a CPU and a firmware program conforming to the specification. In the following description, unless otherwise noted, the UEFI refers to a firmware program.

After a CPU is started, the UEFI initializes minimum hardware for OS booting, and allocates a driver (hereinafter, referred to as a UEFI driver) and the like provided in the UEFI to a memory area. The UEFI performs disk access to a storage device such as a hard disk drive (HDD) and performs network access to an external server by using the UEFI driver to load an OS image in a memory such as a dynamic random access memory (DRAM) and boots the OS.

After the OS has been booted, some programs in the UEFI reside in the memory and operate in response to calls from the OS.

Related arts are disclosed in Japanese Laid-open Patent Publication No. 2003-242026 and Japanese Laid-open Patent Publication No. 2008-158964.

SUMMARY

According to an aspect of the embodiments, an apparatus includes a memory and a processor that executes a load process. In the load process, the processor sets, in a storage area of the memory, a first storage area and a second storage area that are smaller than the storage area, creates first notification information that informs that the second storage area is unavailable and the first storage area is available, and allocates an area in the first storage area, based on the first notification information. The processor boots an operating system, and responds to a memory information notification request issued by the booted operating system with second notification information that informs that the second storage area is available.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates example configuration parameters for an information processing apparatus according to an embodiment;

FIG. 5 illustrates example configuration values in a memory area notification HOB in an information processing apparatus according to an embodiment;

FIG. 6 illustrates example configuration values in a Memory Space Map entry in an information processing apparatus according to an embodiment;

FIG. 7 illustrates example configuration values in a Memory Map entry in an information processing apparatus according to an embodiment;

FIG. 8 illustrates example configuration values in a Memory Descriptor in an information processing apparatus according to an embodiment;

FIG. 10A and FIG. 10B illustrate an example sequence diagram of an OS booting process to be performed by a UEFI processing unit in an information processing apparatus according to an embodiment;

FIG. 11 is an example flowchart of a process to be performed by a PEI processing unit in an information processing apparatus according to an embodiment;

DESCRIPTION OF EMBODIMENTS

Figure 1:
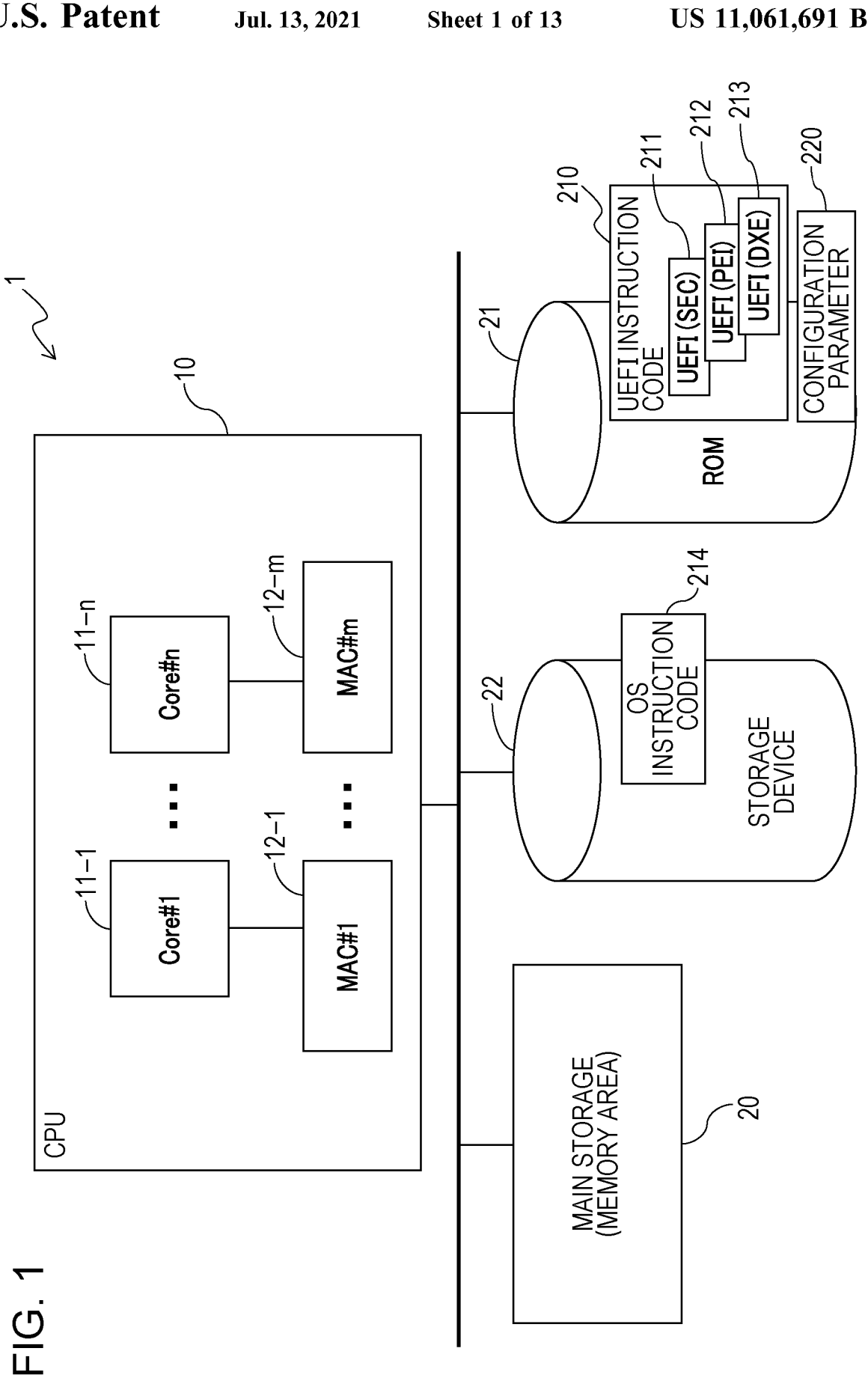
FIG. 1 is an example schematic hardware configuration of an information processing apparatus according to an embodiment.

As described above, the UEFI also uses the memory area prior to the OS booting. In the known techniques, the division of a memory into an OS-process area and an operation-process area is implemented by the function of the OS. Accordingly, prior to the OS booting, the UEFI uses the memory area without dividing the area into the OS-process area and the operation-process area.

Furthermore, the programs in the UEFI and data reside in a part of the memory area being used, and the area is not used for neither OS processing nor operation processing.

Consequently, the existence of the UEFI programs and data in the operation-process memory area causes fragmentation of the operation-process memory area, resulting in decrease in performance.

It is preferable to suppress fragmentation of the operation-process memory area.

Hereinafter, embodiments of an information processing apparatus, loading program, and a loading method will be described with reference to the attached drawings. It is to be understood that the embodiments described below are merely examples, and are not intended to exclude various modifications and the application of techniques not expressly described in the embodiments. The embodiments may be modified (for example, various embodiments and modifications may be combined) in various ways without departing from the scope of the embodiments. The drawings may include not only the components illustrated in the drawings but also other functions and the like.

A. Configuration

FIG. 1 is an example schematic hardware configuration of an information processing apparatus 1 according to an embodiment.

As illustrated in FIG. 1, the information processing apparatus 1 is a computer that includes a CPU 10, a main storage 20, a read only memory (ROM) 21, and a storage device 22. The components in the information processing apparatus 1 are not limited to the components illustrated in FIG. 1, for example, other components such as a display, a keyboard, and a mouse may be included.

For example, the operator may operate such keyboard and mouse to issue various instructions including a rebooting instruction of the information processing apparatus 1 and to input information. The information processing apparatus 1 also includes a power switch (not illustrated) and the operator operates the power switch to turn the power on.

The storage device 22 stores an OS and various programs to be executed by the CPU 10, and data, and may be, for example, a storage device such as a hard disk drive (HDD), or a solid state drive (SSD).

In the example in FIG. 1, the storage device 22 stores an OS instruction code 214.

The OS instruction code 214 is an instruction code group that constitutes the OS. By executing the OS instruction code 214 by cores 11-1 to 11-$n$ of the CPU 10, the functions of the OS are implemented.

The ROM 21 is a semiconductor storage device that stores programs to be executed by the CPU 10 and data.

In the example in FIG. 1, the ROM 21 stores a UEFI instruction code 210 and a configuration parameter 220.

The UEFI has, prior to the boot of an OS, four main phases: Security (SEC), Pre-EFI Initialization (PEI), Driver Execution Environment (DXE), and Boot Device Selection (BDS), and the processing order of the phases is in the order of SEC, PEI, DXE, and BDS.

The UEFI instruction code 210 is an instruction code group that constitutes the UEFI, which is platform firmware. By executing the UEFI instruction code 210 by a core 11 of the CPU 10, the preparation of reading (loading) of the OS into the hardware in the information processing apparatus 1 is implemented. Accordingly, the UEFI instruction code 210 corresponds to a load program for loading the OS.

In the example in FIG. 1, the UEFI instruction code 210 includes a UEFI (SEC) module 211, a UEFI (PEI) module 212, and a UEFI (DXE) module 213, which are modules for implementing the SEC, PEI, and DXE in the above-described phases respectively.

The main storage device 20 is a storage device that temporarily stores various data and programs. The main storage device 20 is used in executing a program by the CPU 10 by temporarily storing and expanding data and the program for use. The main storage device 20 may be, for example, a random access memory (RAM). Hereinafter, the main storage device 20 is also referred to as a memory 20, and hereinafter, a storage area in the memory 20 is also referred to as a memory area.

Figure 2:
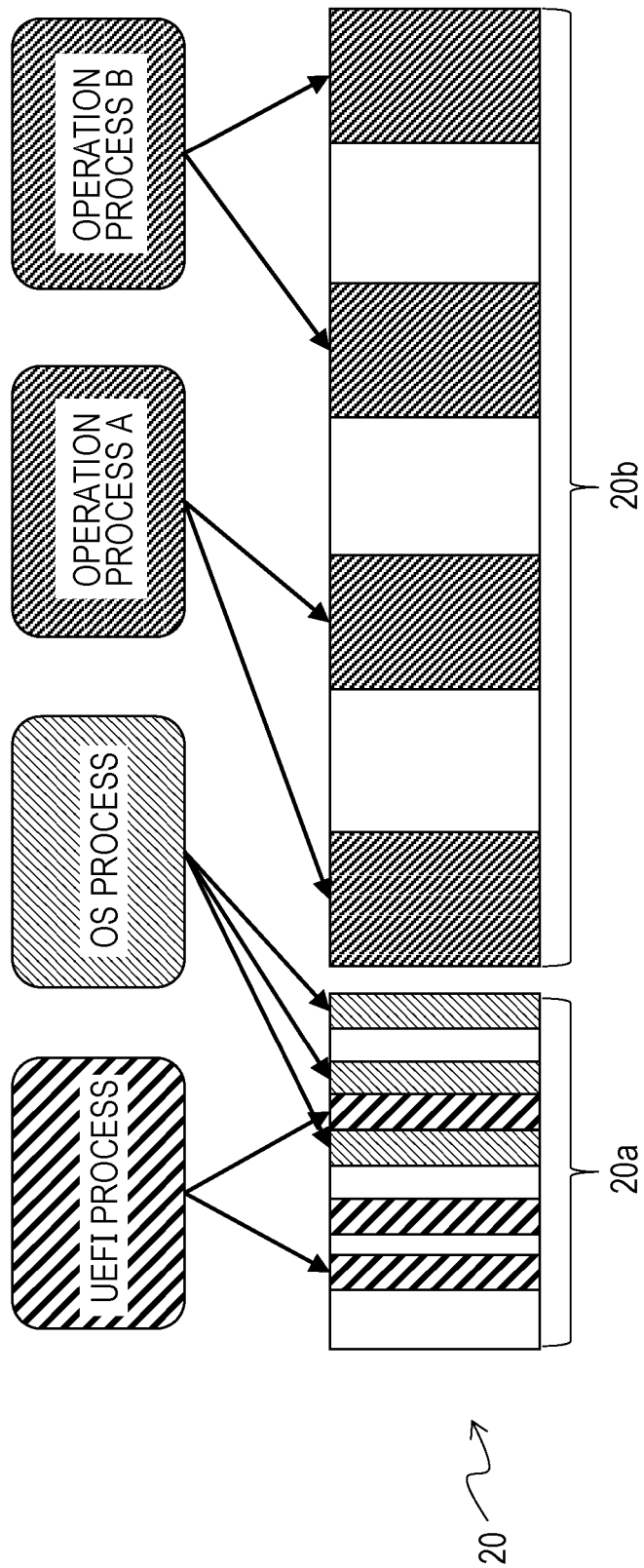
FIG. 2 illustrates how a storage area in a memory in an information processing apparatus according to an embodiment is used.

FIG. 2 illustrates how a storage area in the memory 20 in the information processing apparatus 1 according to the embodiment is used.

In the example in FIG. 2, the information processing apparatus 1 divides and uses a storage area in the memory 20 into an OS-process memory area 20$a$ and an operation-process memory area 20$b$.

For example, the OS-process memory area 20$a$ is used for a process (OS process) to be executed by the OS and a process (UEFI process) to be executed by the UEFI, and the operation-process memory area 20$b$ is used for an operation process. In the example in FIG. 2, the operation-process memory area 20$b$ is used for an operation process A and an operation process B. The operation-process memory area 20$b$ is not used for the OS process and UEFI process.

Accordingly, the fragmentation of the operation-process memory area 20$b$ due to areas used by the UEFI may be avoided.

Hereinafter, although the memory 20 is divided into the OS-process memory area 20$a$ and the operation-process memory area 20$b$, the memory 20 as a whole, which is not divided, may be referred to as a real memory area.

The OS-process memory area 20$a$ and the operation-process memory area 20$b$ may be indicated by referring to the configuration parameter 220.

The configuration parameter 220 stores configuration values of various parameters to be used in processes by a UEFI processing unit 100.

FIG. 3 illustrates an example of the configuration parameter 220 in the information processing apparatus 1 according to the embodiment.

The configuration parameter 220 illustrated in FIG. 3 includes, as configuration parameter names, memory area size, memory area base address, and operation-process memory area size.

The memory area size indicates the total size of the memory area in the main storage device 20, and in the example in FIG. 3, "4 GB" is set.

The memory area base address indicates a starting address of the memory area, and in the example in FIG. 3, "0x0000_0000" is set.

The operation-process memory area size indicates a size of the operation-process memory area 20$b$ in the memory area, and in the example in FIG. 3, "3 GB" is set. Accordingly, in the memory 20, by subtracting the size (3 GB) of the operation-process memory area 20$b$ from the size (4 GB) of the memory area, the size (1 GB) of the OS-process memory area 20$a$ is calculated.

It is to be understood that the configuration parameter 220 is not limited to the example in FIG. 3, various modifications may be implemented. For example, in the example in FIG. 3, the configuration parameter 220 includes the operation-process memory area size, however, it is not limited to this example. For example, instead of the operation-process memory area size, an OS-process memory area size may be included, or together with the operation-process memory area size, an OS-process memory area size may be included. Furthermore, the configuration parameter 220 may include information other than the information illustrated in FIG. 3.

The configuration parameter 220 is used to switch processes by the UEFI processing unit 100, which will be described below.

The CPU (processor) 10 is a processing device for performing various controls and operations, and implements various functions by executing programs stored in the ROM 21, the storage device 22, or other components.

The CPU 10 includes n (n is a natural number greater than or equal to one) cores (CPU cores) 11-1 to 11-$n$ and m (m is a natural number greater than or equal to one) memory access controllers (MACs) 12-1 to 12-$m$.

Hereinafter, as reference numerals for indicating the cores, to specify one of the cores, reference numerals 11-1 to 11-$n$ will be used, and to indicate a core, a reference numeral 11 will be used. Hereinafter, as reference numerals for indicating the MACs, to specify one of the MACs, reference numerals 12-1 to 12-$m$ will be used, and to indicate a MAC, a reference numeral 12 will be used.

A MAC 12 controls data access from a core 11 to a storage area in the memory 20. The core 11 accesses the memory area via the MAC 12. The memory area is mapped to the CPU 10 (core 11) as a mass area of contiguous physical addresses.

Figure 4:
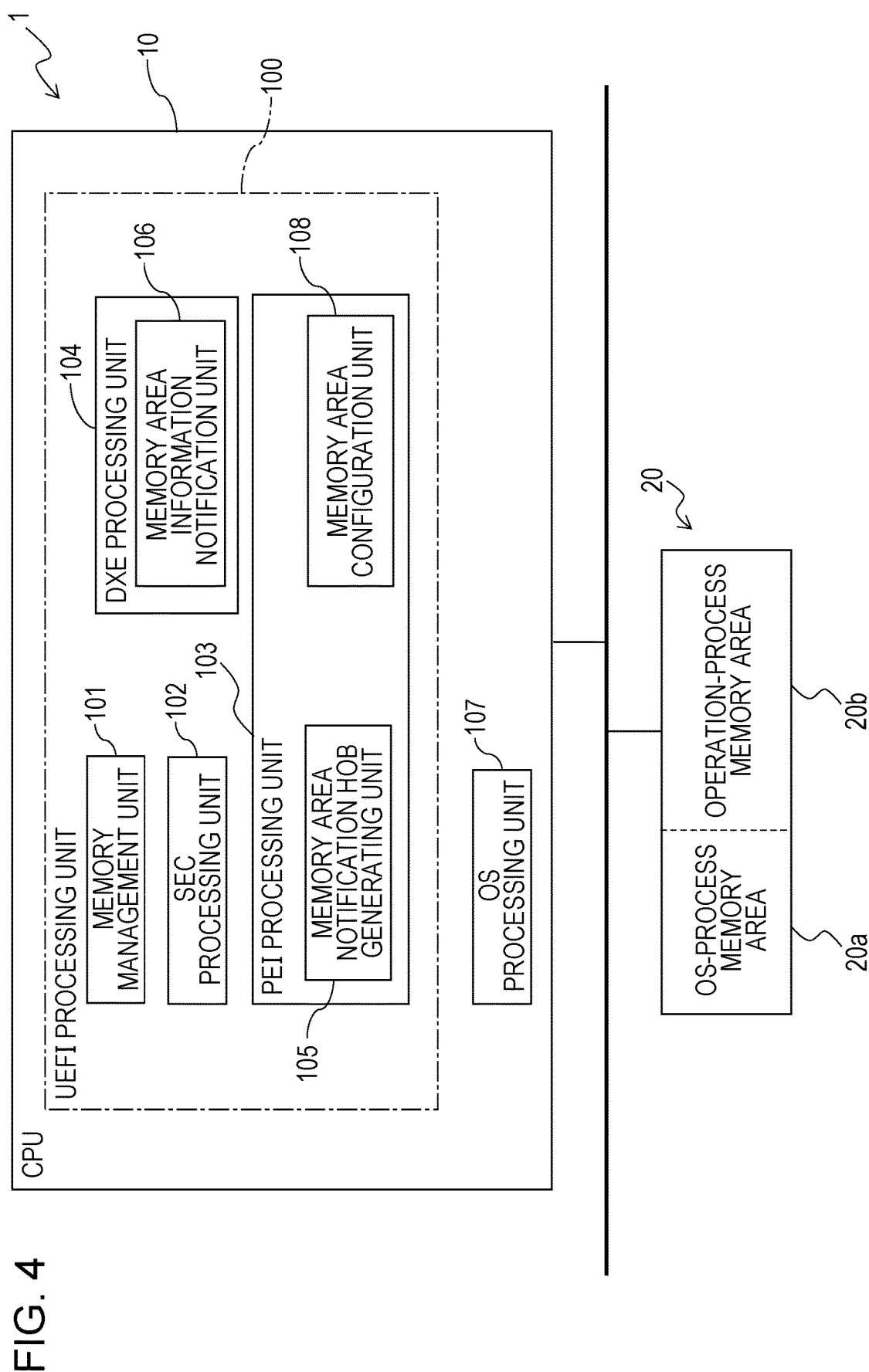
FIG. 4 is an example functional configuration of an information processing apparatus according to an embodiment.

In the information processing apparatus 1, in the cores 11 in the CPU 10, a core 11 (for example, a core 11-1) that has been configured as a primary core executes the UEFI instruction code (load program) 210 to function as the UEFI processing unit 100 and an OS processing unit 107 as illustrated in FIG. 4.

The program (load program) for implementing the functions of the UEFI processing unit 100 and the OS processing unit 107 is provided in a form recorded on a computer-readable recording medium, for example, a flexible disk, a compact disc (CD-ROM, CD-R, CD-RW, or the like), a digital versatile disc (DVD-ROM, DVD-RAM, DVD-R, DVD+R, DVD-RW, DVD+RW, HDDVD, or the like), a Blu-ray Disc, a magnetic disk, an optical disk, a magneto-optical disk, or the like. The computer reads the program from the recording medium, transfers and stores the read program in an internal storage device or an external storage device, and uses the program. The program may be recorded in a storage device (recording medium) such as a magnetic disk, an optical disk, a magneto-optical disk or the like and provided to the computer from the storage device via a communication path.

In the implementation of the functions of the UEFI processing unit 100 and the OS processing unit 107, a program stored in an internal storage device (the ROM 21 in the embodiment) is executed by a microprocessor (in this embodiment, the core 11) of the computer. In this processing, a program recorded in a recording medium may be read and executed by the computer.

FIG. 4 is a functional configuration of the information processing apparatus 1 according to the embodiment.

As illustrated in FIG. 4, the information processing apparatus 1 has the functions of the UEFI processing unit 100 and the OS processing unit 107.

For example, the function of the OS processing unit 107 is implemented by executing the OS instruction code 214 by the core 11.

The OS processing unit 107 implements the functions of the OS. Note that the functions of the OS are known and the description of the functions are omitted.

The OS processing unit 107 implements the functions by using the OS-process memory area 20$a$ in the memory 20.

The UEFI processing unit 100 has the functions of a memory management unit 101, a SEC processing unit 102, a PEI processing unit 103, and a DXE processing unit 104.

For example, the function of the UEFI processing unit 100 is implemented by executing the UEFI instruction code 210 by a core 11 (for example, the core 11-1) that has been configured as a primary core in the cores 11 in the CPU 10.

The UEFI processing unit 100 implements the preparation of reading the OS into the hardware in the information processing apparatus 1.

For example, the function of the memory management unit 101 may be implemented by executing a memory management program (not illustrated) in the UEFI instruction code 210 by the core 11-1.

The memory management unit 101 manages the memory 20. For example, when the information processing apparatus 1 is started, the memory management section 101 sets the OS-process memory area 20$a$ and the operation-process memory area 20$b$ to the memory 20.

In the startup processing, the memory management unit 101 may store (set) a value smaller than the memory capacity of the real memory (memory 20) as the size of the OS-process memory area 20$a$, for example, in the configuration parameter 220, a register (not illustrated), or the like. The memory management unit 101 according to the embodiment sets the size of the operation-process memory area 20$b$, which is smaller than the memory capacity of the real memory (memory 20), to the configuration parameter 220. After the process, the memory management unit 101 starts a driver program.

The driver program obtains the memory 20 through the memory management program to which the small memory areas (the OS-process memory area 20$a$ and the operation-process memory area 20$b$) have been set. The UEFI processing unit 100 (DXE processing unit 104, which will be described below in detail) informs the OS of the real memory area in booting the OS.

A core 11 (for example, the core 11-1) that has been configured as a primary core in the cores 11 in the CPU 10 executes the UEFI (SEC) 211 in the UEFI instruction code 210 to implement the function of the SEC processing unit 102. The core 11-1 executes the UEFI (PEI) 212 to implement the function of the PEI processing unit 103, and the core 11-1 executes the UEFI (DXE) 213 to implement the function of the DXE processing unit 104.

The SEC processing unit 102 implements the SEC phase in the UEFI. The SEC processing unit 102 initializes the CPU 10. For example, the SEC processing unit 102 performs reset processing (Reset Event) of each unit.

After the reset processing, the SEC processing unit 102 causes the core 11-1 to execute the UEFI (PEI) 212 to start the PEI processing unit 103.

The PEI processing unit 103 implements the PEI phase in the UEFI. In the PEI phase, the initialization of the CPU 10 is completed and the memory 20 is detected.

The PEI processing unit 103 refers to the configuration parameter 220, and based on the information registered in the configuration parameter 220, the PEI processing unit 103 obtains the OS-process memory area 20$a$ and the operation-process memory area 20$b$.

Then, the PEI processing unit 103 initializes the entire memory area.

The PEI processing unit 103 has functions of a memory area configuration unit 108 and a memory area notification HOB (Hand-Off-Block) generating unit 105.

The memory area configuration unit 108 sets (obtains) the OS-process memory area 20*a* and the operation-process memory area 20*b* in the storage area in the memory 20.

The memory area configuration unit 108 reads the values set to the configuration parameter 220, and based on the values, the memory area configuration unit 108 obtains the OS-process memory area 20*a* and the operation-process memory area 20*b*.

The memory area notification HOB generating unit 105 creates a memory area notification HOB in which the OS-process memory area 20*a* is set to available and the operation-process memory area 20*b* is set to unavailable.

The memory area notification HOB corresponds to first notification information that informs that the OS-process memory area 20*a* is available and the operation-process memory area 20*b* is unavailable.

The memory area notification HOB generating unit 105 stores the created memory area notification HOB in the OS-process memory area 20*a*. The PEI processing unit 103 provides the DXE processing unit 104 with the memory area notification HOB via the OS-process memory area 20*a*.

In the information processing apparatus 1, one memory area notification HOB is created to a physically continuous memory area having the same attribute information. For example, to the memory 20, the memory area notification HOB generating unit 105 creates two memory area notification HOBs: a memory area notification HOB for the OS-process memory area 20*a*, and a memory area notification HOB for the operation-process memory area 20*b*.

Hereinafter, the memory area notification HOB for the OS-process memory area 20*a* may be referred to as an OS-process memory area notification HOB, and the memory area notification HOB for the operation-process memory area 20*b* may be referred to as an operation-process memory area notification HOB.

Furthermore, hereinafter, a memory area notification HOB may be simply referred to as a HOB.

FIG. 5 illustrates example configuration values in a memory area notification HOB in the information processing apparatus 1 according the embodiment. In FIG. 5, items (fields) in a memory area notification HOB and corresponding values (values) are provided.

The example in FIG. 5 includes items (fields) in a memory area notification HOB: Header, Owner, ResourceType, ResourceAttribute, PhysicalStart, and ResourceLength. These items are at least some of items provided in a memory area notification HOB.

The memory area notification HOB generating unit 105 creates a memory area notification HOB by using the values in the configuration parameter 220.

For example, the memory area notification HOB generating unit 105 sets a base address (for example, 0x0000_0000) of a memory area that has been read from the configuration parameter 220 to PhysicalStart. The memory area notification HOB generating unit 105 also sets a size (for example, 1 GB) of a memory area that has been read from the configuration parameter 220 to ResourceLength. For example, in the configuration parameter 220 in FIG. 3, two HOBs in which 1 GB and 3 GB are set to ResourceLength respectively are created.

The memory area notification HOB generating unit 105, as described below, makes differences in the values of the item ResourceAttribute in an OS-process memory area notification HOB and an operation-process memory area notification HOB.

For example, in an OS-process memory area notification HOB, ResourceAttribute has an OR value of the values of the following five flags: EFI_RESOURCE_ATTRIBUTE_PRESENT, EFI_RESOURCE_ATTRIBUTE_INITIALIZED, EFI_RESOURCE_ATTRIBUTE_TESTED, EFI_RESOURCE_ATTRIBUTE_SINGLE_BIT_ECC, and EFI_RESOURCE_ATTRIBUTE_WRITE_BACK_CACHEABLE, in which the flag EFI_RESOURCE_ATTRIBUTE_PRESENT indicates that the OS-process memory area 20*a* is present (PRESENT), the flag EFI_RESOURCE_ATTRIBUTE _INITIALIZED indicates that the OS-process memory area 20*a* has been initialized (INITIALIZED), and the flag EFI_RESOURCE_ATTRIBUTE_TESTED indicates that the OS-process memory area 20*a* has been tested (TESTED).

Accordingly, an OS-process memory area 20*a* to which the flags EFI_RESOURCE_ATTRIBUTE_PRESENT, EFI_RESOURCE_ATTRIBUTE_INITIALIZED, and EFI_RESOURCE_ATTRIBUTE_TESTED have been set is handled by the DXE processing unit 104 such that the OS-process memory area 20*a* is present (PRESENT), initialized (INITIALIZED), and tented (TESTED), and is an available area.

With such a function, the OS-process memory area notification HOB serves as notification information that informs that the OS-process memory area 20*a* is available.

In an operation-process memory area notification HOB, ResourceAttribute has an OR value of the following four flags: EFI_RESOURCE_ATTRIBUTE_PRESENT, EFI_RESOURCE_ATTRIBUTE_INITIALIZED, EFI_RESOURCE_ATTRIBUTE_SINGLE_BIT_ECC, and EFI_RESOURCE_ATTRIBUTE_WRITE_BACK_CACHEABLE. As will be understood from the flags, to an operation-process memory area 20*b*, the flag EFI_RESOURCE_ATTRIBUTE_PRESENT and the flag EFI_RESOURCE_ATTRIBUTE _INITIALIZED have been set. Accordingly, the operation-process memory area 20*b* is present (PRESENT) and initialized (INITIALIZED), however, a flag that indicates tested (TESTED) is not set.

With the information, in the DXE processing unit 104 that has received the operation-process memory area notification HOB determines that the operation-process memory area 20*b* is "not tested"="not yet determined to be available" and thus determines that the operation-process memory area 20*b* is an "area not to be used (unavailable)".

With such a function, the operation-process memory area notification HOB serves as notification information that informs that the operation-process memory area 20*b* is unavailable.

As described above, in the PEI processing unit 103, the memory area notification HOB generating unit 105 provides the DXE processing unit 104 with the memory area notification HOB (operation-process memory area notification HOB) in which the operation-process memory area 20*b* is set to unavailable. With the information, the DXE processing unit 104 determines that only the OS-process memory area 20*a* is available in the memory 20. Consequently, the UEFI processing unit 100 hinders the use of the operation-process memory area 20*b* in the memory 20.

The PEI processing unit 103 copies an image of the UEFI (DXE) 213 to the OS-process memory area 20*a*, and then causes the core 11-1 to execute the UEFI (DXE) 213 to start the DXE processing unit 104.

The DXE processing unit 104 implements the DXE phase in the UEFI.

The DXE processing unit 104 allocates as appropriate a memory to be used in the memory area that has been informed to be available by the memory area notification HOB, that is, in the OS-process memory area 20*a*, and boots the OS.

With such a function, the DXE processing unit 104 serves as a boot processing unit that allocates an area to the OS-process memory area 20*a* based on a memory area notification HOB and boots the OS.

The DXE processing unit 104 also has a function of a memory area information notification unit 106.

The memory area information notification unit 106 receives a memory information notification request from the OS, and then provides information about an area that has already been used by the DXE processing unit 104 and an area that has not yet been used in a memory area (OS-process memory area 20*a*) that has been informed as available by a memory area notification HOB.

The memory information notification request is an inquiry issued by the OS in the OS booting processing to the DXE processing unit 104 to inquire about a memory area available for the OS.

Furthermore, the memory area information notification unit 106 informs the OS that the area that has already been informed as an unavailable are by the memory area notification HOB, that is, the operation-process memory area 20*b*, is available and an unused area. This information corresponds to second notification information that informs that the operation-process memory area 20*b* is available.

The second notification information enables the OS to use the operation-process memory area 20*b* in the memory 20 in the information processing apparatus 1. As described above, the DXE processing unit 104 releases the operation-process memory area 20*b* from an unavailable state and changes the state to an available state.

With such a function, the memory area information notification unit 106 serves as a respond unit that responds to a memory information notification request issued by the OS with second notification information that informs that the operation-process memory area 20*b* is available.

The DXE processing unit 104 creates a memory space map (Memory Space Map) by using a memory area notification HOB. A Memory Space Map is information about the structure of the memory 20 that is obtained by the DXE processing unit 104, and a group of structured data called a Memory Space Map entry.

FIG. 6 illustrates example configuration values of a Memory Space Map entry in the information processing apparatus 1 according the embodiment. In FIG. 6, items (fields) in a Memory Space Map and corresponding values (values) are provided.

The example in FIG. 6 includes items (fields) in a Memory Space Map: BaseAddress, EndAddress, Attributes, and GcdMemoryType. These items are at least some of items provided in a Memory Space Map.

To the GcdMemoryType, a value that indicates the type of memory area as hardware is set.

For example, to the GcdMemoryType, the type of memory area that is set based on the information of the ResourceAttribute in a corresponding memory area notification HOB is set.

For example, when (i) EFI_RESOURCE_ATTRIBUTE_TESTED is set to the ResourceAttribute in a memory area notification HOB, the DXE processing unit 104 sets EfiGcdMemoryTypeSystemMemory to the GcdMemoryType. The EfiGcdMemoryTypeSystemMemory indicates the OS-process memory area 20*a*.

When (ii) EFI_RESOURCE_ATTRIBUTE_TESTED is not set to the ResourceAttribute in a memory area notification HOB and EFI_RESOURCE_ATTRIBUTE_INITIALIZED or EFI_RESOURCE_ATTRIBUTE_PRESENT is set, the DXE processing unit 104 sets EfiGcdMemoryTypeReserved to the GcdMemoryType. The EfiGcdMemoryTypeReserved indicates the operation-process memory area 20*b*.

When neither (i) nor (ii) above applies, the DXE processing unit 104 sets EfiGcdMemoryTypeNonExistent to the GcdMemoryType.

Accordingly, to the OS-process memory area 20*a*, EfiGcdMemoryTypeSystemMemory is set and to the operation-process memory area 20*b*, EfiGcdMemoryTypeReserved is set respectively.

The memory area information notification unit 106 in the DXE processing unit 104 creates a memory map (Memory Map). The Memory Map is used to manage the memory 20 and indicates how the memory 20 is used at the present time. The Memory Map is a group of structured data called a Memory Map entry.

The memory area information notification unit 106 creates an entry of a Memory Map in response to a reception of a memory information notification request from the OS.

FIG. 7 illustrates example configuration values of a Memory Map entry in the information processing apparatus 1 according the embodiment. In FIG. 7, items (fields) and corresponding values (values) in a Memory Map are provided.

The example in FIG. 7 includes items (fields) in a Memory Map: Type, Start, End, and Attribute. These items are at least some of items provided in a Memory Map.

The Type indicates the type of memory area represented by the entry and indicates the use by the program.

For the value of the Type, a value defined in EFI_MEMORY_TYPE in accordance with the UEFI specification is used.

For example, whenever the memory area information notification unit 106 creates (or adds) a new entry, sets EfiConventionalMemory to the Type.

In initialization of a Memory Map, each entry in the Memory Map is created only in an area described in an entry in which the GcdMemoryType of the Memory Space Map is EfiGcdMemoryTypeSystemMemory.

In response to a reception of a request (memory information notification request) for notifying memory information from the OS, the memory area information notification unit 106 adds an entry that corresponds to an area defined by the GcdMemoryType of the Memory Space Map that is set to EfiGcdMemoryTypeReserved.

When the UEFI runs out of memory during operation, the memory area information notification unit 106 also adds an entry that corresponds to an area defined by the GcdMemoryType of the Memory Space Map that is set to EfiGcdMemoryTypeReserved. This processing enables the operation-process memory area 20*b* to become available when the memory area in the memory 20 is insufficient, and thereby the startup process of the information processing apparatus 1 can be reliably performed.

Furthermore, the memory area information notification unit 106 performs creation of a memory descriptor (Memory Descriptor). The Memory Descriptor is information to be informed from the UEFI processing unit 100 to the OS, for example, created based on a Memory Map. The Memory Descriptor is a group of structured data called a Memory Descriptor entry.

FIG. 8 illustrates example configuration values of a Memory Descriptor entry in the information processing apparatus 1 according the embodiment. In FIG. 8, items (fields) and corresponding values (values) in a Memory Descriptor are provided.

The example in FIG. 8 includes items (fields) in a Memory Descriptor: Type, PhysicalStart, VirtualStart, and NumberOfPages. These items are at least some of items provided in a Memory Descriptor.

The Type indicates the type of memory area indicated by the entry and indicates the use by the program.

For the value of the Type, a value defined in EFI_MEMORY_TYPE in accordance with the UEFI specification is used. For example, to the operation-process memory area 20b, EfiConventionalMemory is set. The configuration enables the OS to use the operation-process memory area 20b. To the OS-process memory area 20a, a value obtained in accordance with an allocation method of the memory 20 is set.

Figure 9:
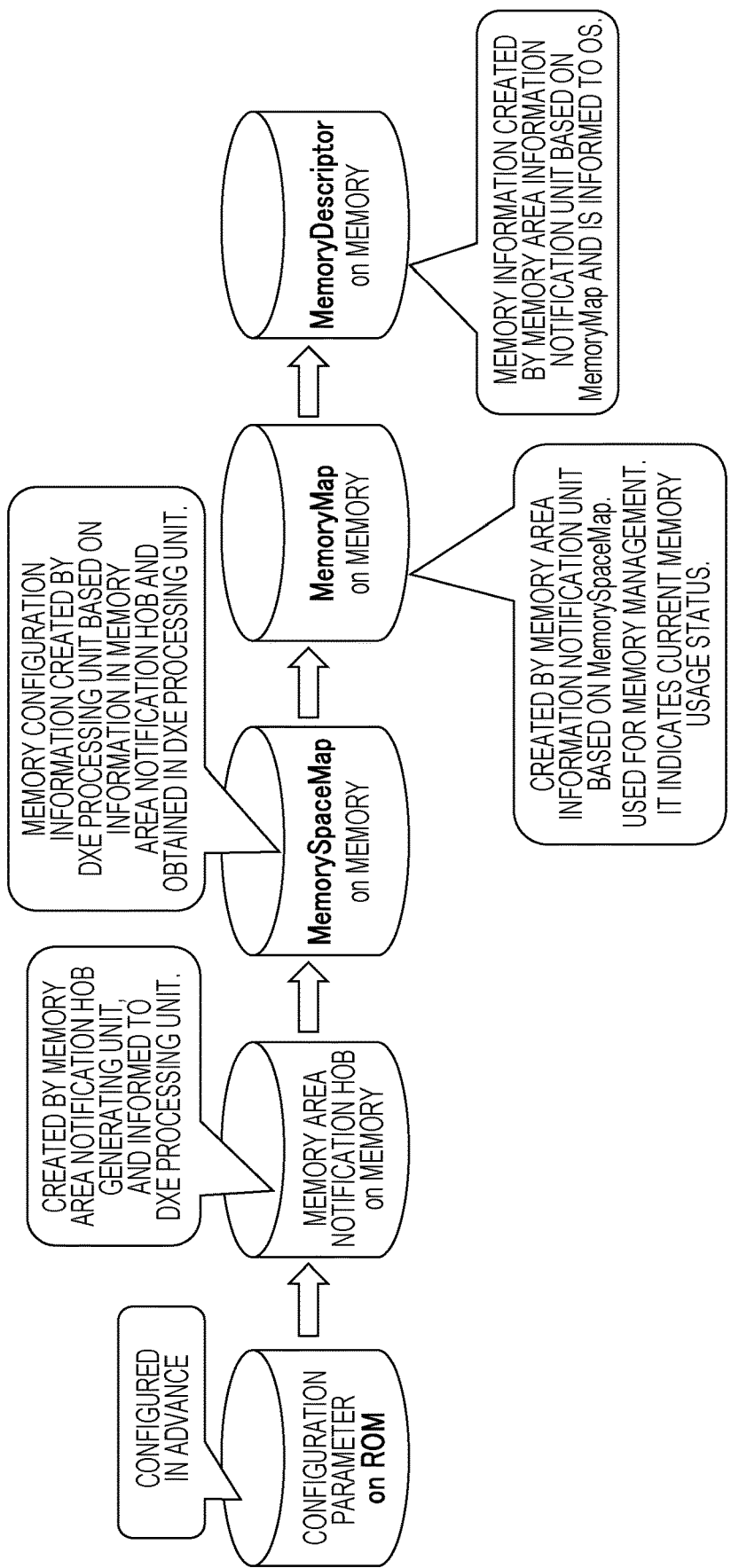
FIG. 9 illustrates example relationships between data used in a SEC processing unit, a PEI processing unit, a DXE processing unit, and an OS respectively in an information processing apparatus according to an embodiment.

FIG. 9 illustrates example relationships between data to be used in the SEC processing unit 102, the PEI processing unit 103, the DXE processing unit 104, and the OS respectively in the information processing apparatus 1 according to the embodiment.

The configuration parameter 220 is configured in advance and stored in the ROM 21. The configuration parameter 220 is used to create a memory area notification HOB.

A memory area notification HOB is created by the PEI processing unit 103 (memory area notification HOB generating unit 105) and is stored in the OS-process memory area 20a in the memory 20. The memory area notification HOB is passed to the DXE processing unit 104 via the OS-process memory area 20a.

The memory area notification HOB is used for creation of a Memory Space Map. A Memory Space Map is information about the structure of the memory 20 that is obtained by the DXE processing unit 104, and created by the DXE processing unit 104. The Memory Space Map is stored in the OS-process memory area 20a in the memory 20.

The Memory Space Map is used for creation of a Memory Map. The Memory Map is used to manage the memory 20 and indicates how the memory 20 is used at the time (at the present time). The Memory Map is created by the DXE processing unit 104 (memory area information notification unit 106) based on a Memory Space Map.

The Memory Map is used for creation of a Memory Descriptor. The Memory Descriptor is information to be passed to the OS. The Memory Descriptor has a structure conforming to EFI_MEMORY_DESCRIPTOR defined by the UEFI specification.

(B) Operation

In the information processing apparatus 1 according to the above-described embodiment, in response to power supply to the CPU 10, each core 11 reads the UEFI instruction code 210 stored in the ROM 21 and starts the execution of the read instruction code, that is, the functions of the UEFI are implemented.

The activated UEFI executes OS booting processing by using only one core 11 (for example, the core 11-1). In the information processing apparatus 1, the core 11-1 that is the core for OS booting processing performs the OS processing and the other cores 11-2 to 11-n performs operation processing.

Figure 10B:
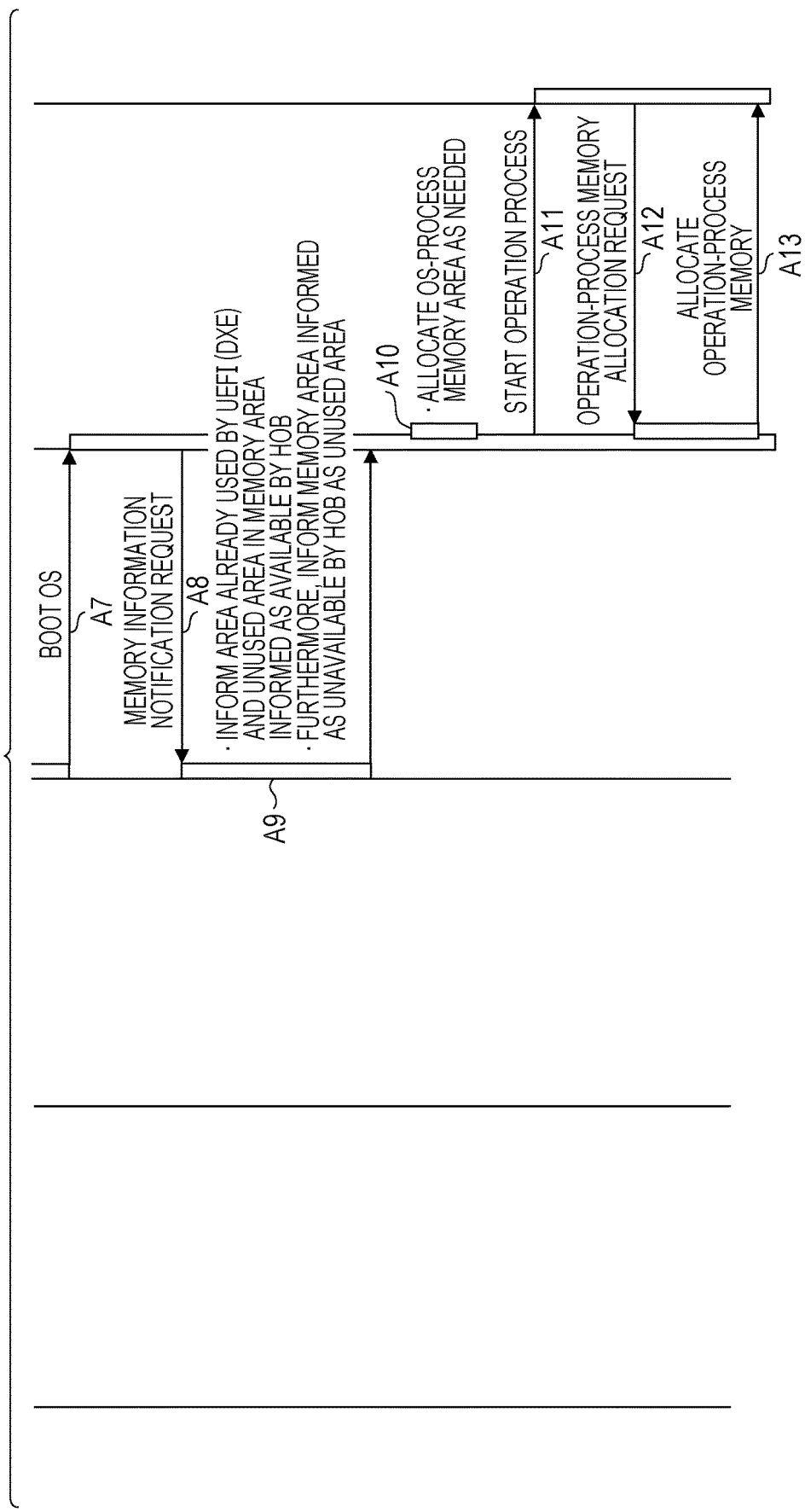

With reference to a sequence diagram in FIG. 10A and FIG. 10B, the OS booting processing to be performed by the UEFI processing unit 100 in the information processing apparatus 1 according to the embodiment will be described.

After handling a reset process (Reset Event), the SEC processing unit 102 starts the PEI processing unit 103 (see arrow A1).

In the PEI processing unit 103, the memory area configuration unit 108 refers to the configuration parameter 220, and based on the information registered in the configuration parameter 220, the memory area configuration unit 108 obtains the OS-process memory area 20a and the operation-process memory area 20b. Then, the PEI processing unit 103 initializes the entire memory area (see arrow A2).

In the PEI processing unit 103, the memory area notification HOB generating unit 105 creates a memory area notification HOB (first notification information) in which the OS-process memory area 20a is set to available and the operation-process memory area 20b is set to unavailable (see arrow A3). The memory area notification HOB generating unit 105 stores the created memory area notification HOB in the OS-process memory area 20a.

The PEI processing unit 103 copies the image of the UEFI (DXE) 213 in the OS-process memory area 20a (see arrow A4).

As described above, to store the OS-process memory area notification HOB and the image of the UEFI (DXE) 213, the PEI processing unit 103 uses the OS-process memory area 20a and does not use the operation-process memory area notification HOB.

After the process, the PEI processing unit 103 causes the core 11-1 to execute the UEFI (DXE) 213 to start the DXE processing unit 104 (see arrow A5).

The DXE processing unit 104 allocates an area to be used as appropriate to the memory area (OS-process memory area 20a) that has been informed to be available by the memory area notification HOB (see arrow A6). After the process, the DXE processing unit 104 loads and boots the OS (see arrow A7).

The OS sends a memory information notification request to the DXE processing unit 104 (see arrow A8). In response to the memory information notification request, the memory area information notification unit 106 in the DXE processing unit 104 informs, in the memory area (OS-process memory area 20a) that has been informed to be available by the memory area notification HOB, the area that has already been used by the DXE processing unit 104 and the unused area. Furthermore, the memory area information notification unit 106 informs the OS that the memory area (operation-process memory area 20b) that has been informed to be unavailable by the memory area notification HOB is available and an unused area (see arrow A9).

The information indicating that the operation-process memory area 20b is available and is an unused area corresponds to the second notification information.

The OS allocates the OS-process memory area 20a as appropriate and performs processing (see arrow A10). The OS, for example, to the cores 11-2 to 11-n that performs operation processing, instructs to start operation processing (see arrow A11). In the operation process, allocation of an area in the operation-process memory area 20b is requested to the OS (arrow A12).

In response to the request, the OS allocates an area to the operation-process memory area 20b as a response to the operation process (see arrow A13).

With reference to a flowchart (step B1 to step B5) in FIG. 11, the processing to be performed by the PEI processing unit 103 in the information processing apparatus 1 according to the embodiment will be described.

In step B1, the memory area notification HOB generating unit 105 in the PEI processing unit 103 obtains values in the configuration parameter 220.

In step B2, the memory area notification HOB generating unit 105 creates a memory area notification HOB (OS-process memory area notification HOB) that corresponds to the OS-process memory area 20a. The memory area notification HOB generating unit 105 stores the created OS-process memory area notification HOB in the OS-process memory area 20a.

In step B3, the memory area notification HOB generating unit 105 creates a memory area notification HOB (operation-process memory area notification HOB) that corresponds to the operation-process memory area 20b. The memory area notification HOB generating unit 105 stores the created operation-process memory area notification HOB in the OS-process memory area 20a.

In step B4, the PEI processing unit 103 loads the UEFI (DXE) 213 in the OS-process memory area 20a.

In step B5, the PEI processing unit 103 causes the core 11-1 to execute the UEFI (DXE) 213 to start the DXE processing unit 104.

The PEI processing unit 103 provides the DXE processing unit 104 with the starting addresses of the memory area notification HOBs created in steps B2 and B3 and stored in the OS-process memory area 20a.

Figure 12:
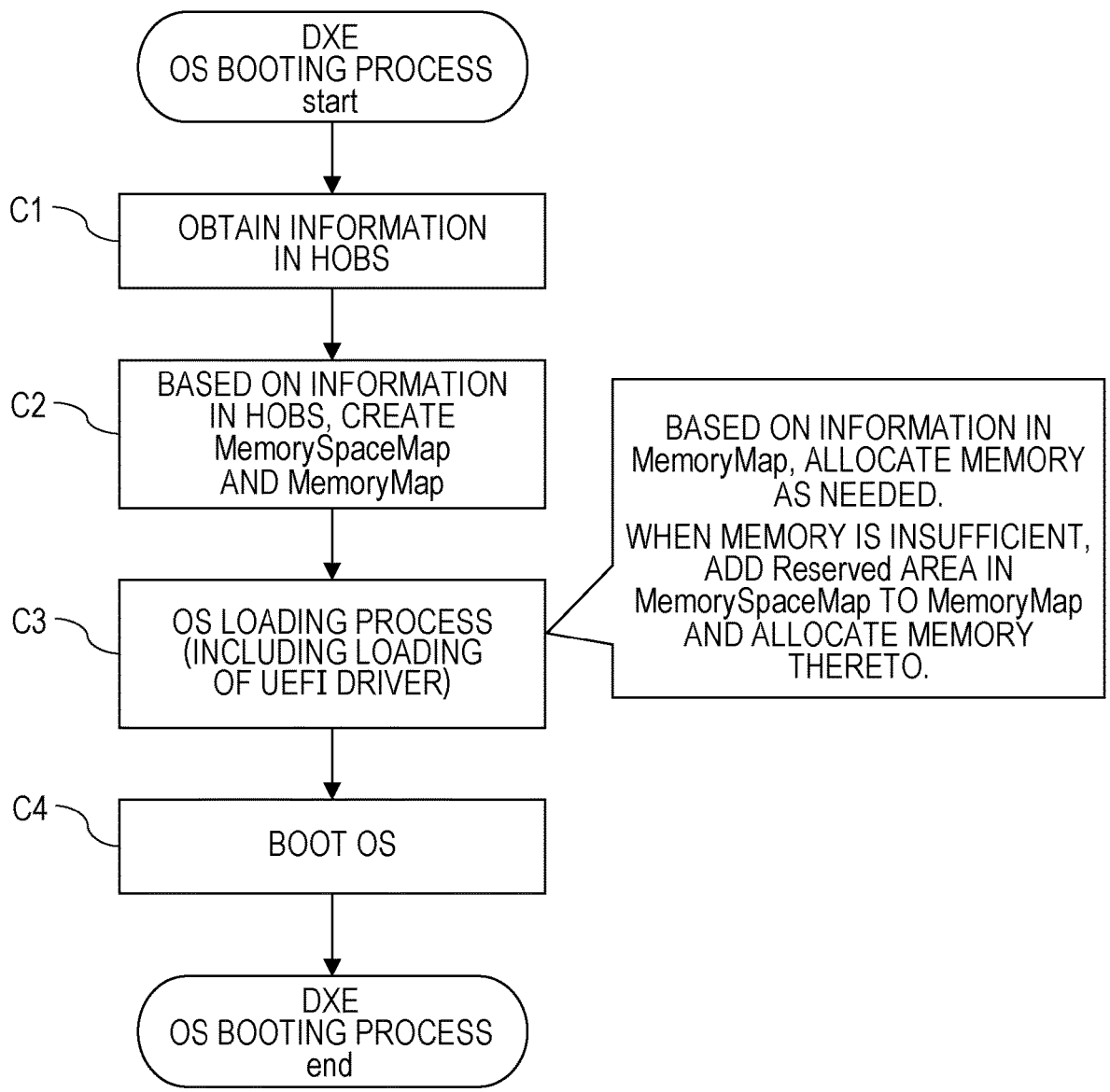
FIG. 12 is an example flowchart of an OS booting process to be performed by a DXE processing unit in an information processing apparatus according to an embodiment.

Next, with reference to a flowchart (step C1 to step C4) in FIG. 12, the OS booting process to be performed by the DXE processing unit 104 in the information processing apparatus 1 according to the embodiment will be described.

In step C1, the DXE processing unit 104 obtains the memory area notification HOBs stored in the OS-process memory area 20a.

In step C2, the DXE processing unit 104 creates a Memory Space Map and a Memory Map based on the information in the memory area notification HOBs.

In step C3, the DXE processing unit 104 performs the OS loading process. This process includes loading of a UEFI driver. The DXE processing unit 104 allocates a memory area as appropriate based on the information in the Memory Map. When the memory area is insufficient, the DXE processing unit 104 adds a Reserved area in the Memory Space Map to the Memory Map, and allocates a memory area to the area.

In step C4, the DXE processing unit 104 boots the OS. Then, the OS booting process ends.

Figure 13:
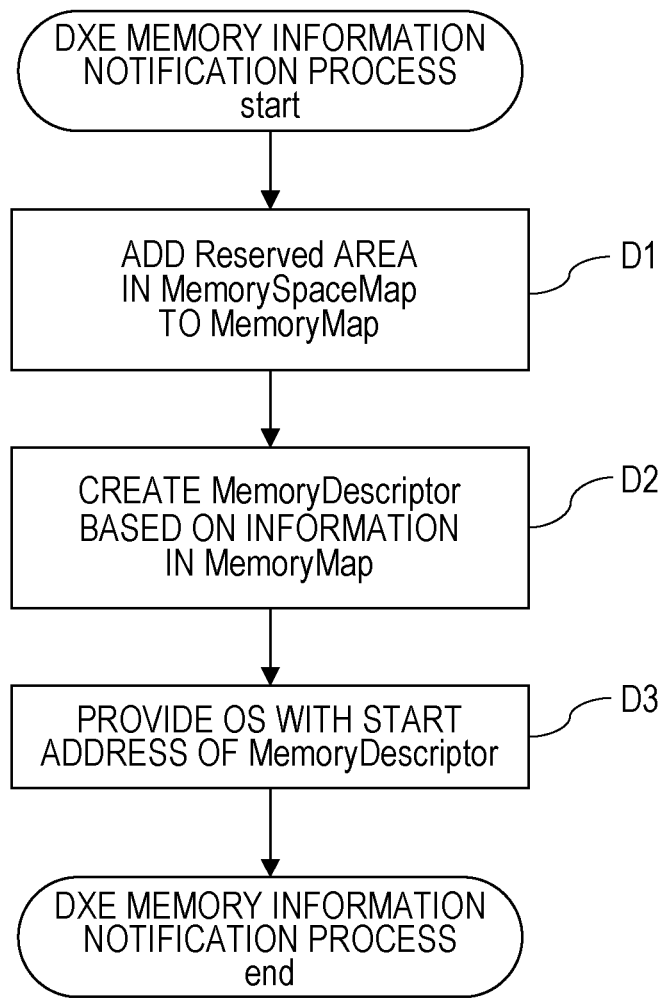
FIG. 13 is an example flowchart of a process of notifying memory information to be performed by a DXE processing unit in an information processing apparatus according to an embodiment.

With reference to a flowchart (step D1 to step D3) in FIG. 13, the memory information notification process to be performed by the DXE processing unit 104 in the information processing apparatus 1 according to the embodiment will be described.

In step D1, the memory area information notification unit 106 in the DXE processing unit 104 creates an entry by adding a Reserved area in the Memory Space Map to the Memory Map.

In step D2, the memory area information notification unit 106 creates a Memory Descriptor based on the information in the Memory Map.

In step D3, the memory area information notification unit 106 provides the OS with the starting address of the Memory Descriptor. Then, the memory information notification process by the DXE processing unit 104 (memory area information notification unit 106) ends.

C. Advantages

As described above, in the information processing apparatus 1 according to the embodiment, in the startup process of the information processing apparatus 1, in the PEI phase, the memory area notification HOB generating unit 105 provides the DXE processing unit 104 with the memory area notification HOB (operation-process memory area notification HOB) in which the operation-process memory area 20b is set to unavailable.

With the information, in the DXE phase, the DXE processing unit 104 defines only the OS-process memory area 20a to be an available area in the memory 20. Accordingly, in the startup process of the information processing apparatus 1, the UEFI processing unit 100 implements the loading of the OS by using only the OS-process memory area 20a.

Consequently, the UEFI processing unit 100 may be hindered from using the operation-process memory area 20b in the memory 20, and thus the fragmentation of the operation-process memory area 20b in the memory 20 that would be caused by the use of the operation-process memory area 20b by the UEFI processing unit 100 may be inhibited.

Furthermore, in the DXE phase, the memory area information notification unit 106 informs the OS that the area that has already been informed as an unavailable by the memory area notification HOB, that is, the operation-process memory area 20b, is available and an unused area. The information enables the OS to use the operation-process memory area 20b in the memory 20. Accordingly, the memory area information notification unit 106 releases the operation-process memory area 20b and changes the state to an available state for the CPU 10. Consequently, the OS and the operation processing are not affected.

D. Other

It is to be understood that the disclosed technique is not limited to the above-described embodiment, and various modifications can be made without departing from the scope of the embodiment. The configurations and processes according to the embodiment may be selected as appropriate or may be combined appropriately.

It is to be understood that one of those skilled in the art may implement and manufacture the embodiment according to the above-described disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to execute a load process including:
setting, in a storage area of the memory, a first storage area and a second storage area that are smaller than the storage area,
creating first notification information that informs that the second storage area is unavailable and the first storage area is available,
allocating an area, used for booting an operating system, in the first storage area, based on the first notification information, and booting the operating system, and responding to a memory information notification request issued by the booted operating system with second notification information that informs that the second storage area is available and that informs the allocated area used for booting the operating system in the first storage area.

2. The information processing apparatus of claim 1, wherein the load process includes:
   storing the created first notification information in the first storage area, and
   reading the first notification information from the first storage area.

3. A non-transitory, computer-readable recording medium having stored therein a program for causing a computer included in an information processing apparatus to execute a load process for loading an operating system, the load process comprising:
   setting, in a storage area of the memory, a first storage area and a second storage area that are smaller than the storage area;
   creating first notification information that informs that the second storage area is unavailable and the first storage area is available;
   allocating an area, used for booting an operating system, in the first storage area, based on the first notification information, and booting the operating system; and
   responding to a memory information notification request issued by the booted operating system with second notification information that informs that the second storage area is available and that informs the allocated area used for booting the operating system in the first storage area.

4. The non-transitory, computer-readable recording medium of claim 3, the load process further comprising:
   storing the created first notification information in the first storage area; and
   reading the first notification information from the first storage area.

5. A load method performed by an information processing apparatus including a memory and a processor; the load method comprising:
   setting, in a storage area of the memory, a first storage area and a second storage area that are smaller than the storage area;
   creating first notification information that informs that the second storage area is unavailable and the first storage area is available;
   allocating an area, used for booting an operating system, in the first storage area, based on the first notification information, and booting the operating system; and
   responding to a memory information notification request issued by the booted operating system with second notification information that informs that the second storage area is available and that informs the allocated area used for booting the operating system in the first storage area.

6. The load method of claim 5, further comprising:
   storing the created first notification information in the first storage area; and
   reading the first notification information from the first storage area.

* * * * *